United States Patent [19]

Bouvard et al.

[11] Patent Number: 4,779,951
[45] Date of Patent: Oct. 25, 1988

[54] DEVICE FOR CONNECTING ON SITE TWO OPTICAL FIBER TRANSMISSION CABLES

[75] Inventors: André Bouvard; Jean P. Hulin; Michel de Vecchis, all of Conflans-Sainte-Honorine, France

[73] Assignee: Thomson-CSF, Paris, France

[21] Appl. No.: 353,381

[22] Filed: Mar. 1, 1982

[30] Foreign Application Priority Data

Mar. 3, 1951 [FR] France .................................. 81 04201

[51] Int. Cl.⁴ ............................................... G02B 6/38
[52] U.S. Cl. ................................................... 350/96.21
[58] Field of Search ...................................... 350/96.21

[56] References Cited

U.S. PATENT DOCUMENTS

| | | | |
|---|---|---|---|
| 4,049,414 | 9/1977 | Smith | 350/96.21 |
| 4,171,867 | 10/1979 | Cocito | 350/96.21 |
| 4,248,499 | 2/1981 | Liertz et al. | 350/96.21 |
| 4,359,262 | 11/1982 | Dolan | 350/96.22 |

Primary Examiner—William L. Sikes
Assistant Examiner—Robert E. Wise
Attorney, Agent, or Firm—Cushman, Darby & Cushman

[57] ABSTRACT

A device for connecting on site two optical fiber transmission cables comprises a table for installation in a cable tunnel on the site and which is provided with a notch on its circumference, a tight box which bears against the table and whereof the two lateral faces have two openings in which are engaged the two cables to be connected, a splicing bench positioned in the table notch and on which are arranged tools for splicing the two cables, and means for joining the bench to the table.

21 Claims, 1 Drawing Sheet

U.S. Patent     Oct. 25, 1988     4,779,951
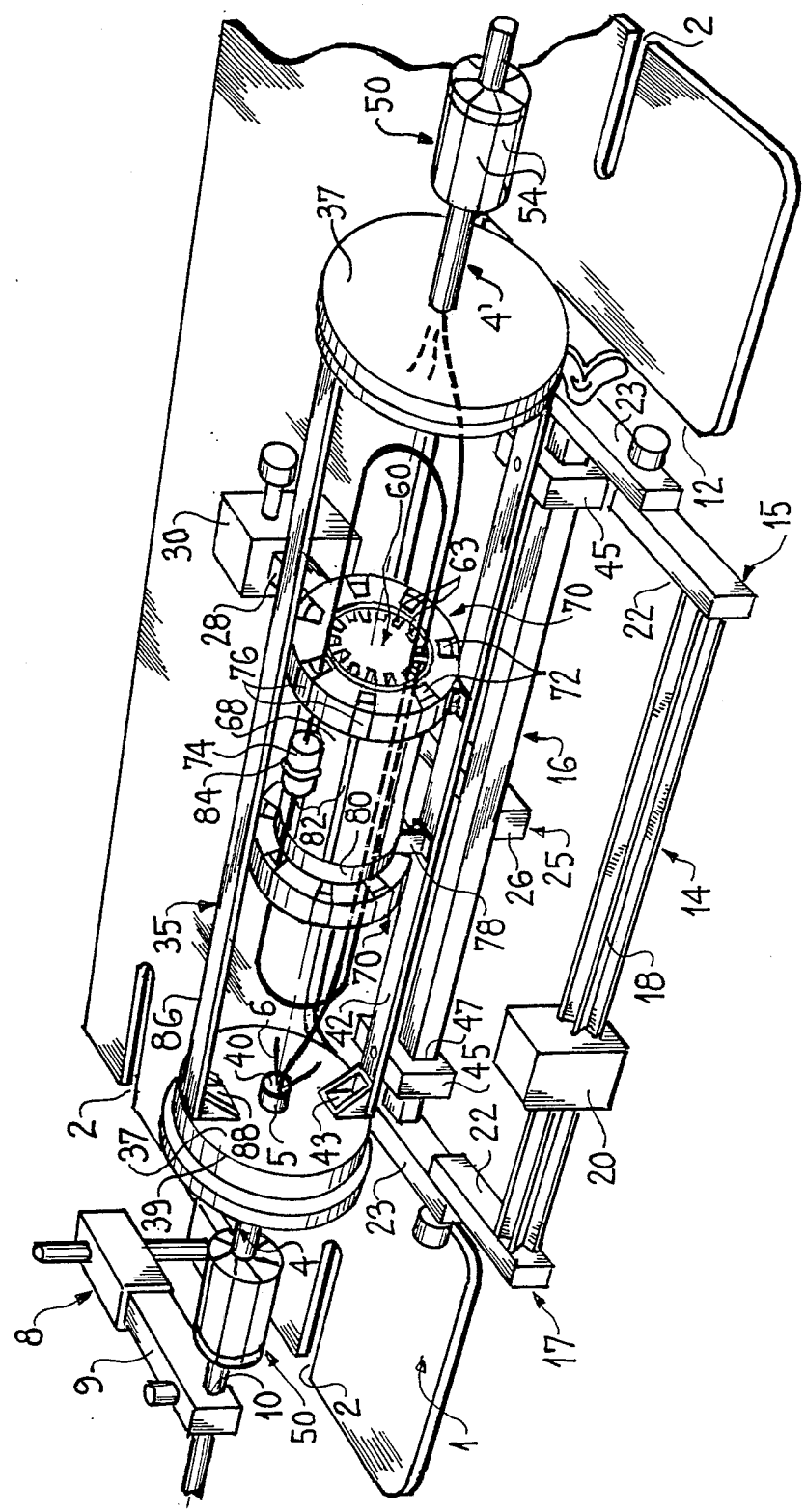

DEVICE FOR CONNECTING ON SITE TWO OPTICAL FIBER TRANSMISSION CABLES

BACKGROUND AND SUMMARY OF THE PRESENT INVENTION

The present invention generally relates to devices for connecting two transmission cables each comprising, beneath a protective jacket, a plurality of cable elements. More specifically, the invention is concerned with a device for connecting two optical fiber cables for installation on site, i.e. for example in a cable tunnel, where the cable elements are spliced.

Processes and devices are already known which make it possible to splice two cable elements each having, beneath a protective jacket, a dielectric cylindrical support reinforced along its axis and provided with grooves, which are either longitudinal or helical having a single or alternating pitch, regularly distributed over its circumference and whereby each houses and optical fiber. Reference can be made for example to European Patent Application filed by the Assignee and published on Sept. 23, 1981 under No. 36,369 for : "Process and apparatus for connecting on site optical fiber cables". According to this patent application, the process of splicing two optical fiber cable elements consists of carrying out on a so-called splicing bench the connection and then alignment of two extending end fittings serving as connectors and integral respectively with the two cable elements. These operations are relatively difficult to perform and generally require considerable skill on the part of the operator.

Moreover, when it is necessary to connect two optical fiber cables on the actual site, it is necessary to position the connecting device in a very careful manner, so as to enable the operator to make the various splices on the optimum working conditions. In addition, the installation of the connecting device must contribute to reducing the duration of the connecting operation. Furthermore, once the cable elements have been spliced, they have to be arranged in an ordered manner within a tight box or case, so that in the case of a fault on the part of one of the cable elements, the operator can obtain rapid access thereto.

The object of the present invention is to make it possible to fulfil the aforementioned objectives by proposing a connecting device for two optical fiber cables, which is particularly suitable for installation on site.

To this end, the present invention relates to a device for connecting on site two optical fiber transmission cables each comprising at least one cable element, wherein the device comprises:

a table to be installed in an on site tunnel and which has a notch on its circumference;

a tight splicing box for protecting the two cable elements once they have been connected together and fitted so as to be supported on the table, the two lateral faces of said box having two openings in which are engaged respectively the two cables to be connected;

a splicing bench which can be inclined and positioned in the table notch, including a rail disengaged from the box and facing the latter and on which are arranged tools used for splicing the two cable elements; and means for joining the bench to the table such that bench and table together form a rigid unit.

According to another feature of the invention, the splicing box incorporates a member in the form of a drum having longitudinal grooves and two members forming annular collars fitted at the two ends of the drum and each provided with slots distributed over the periphery thereof. Each cable element traverses the drum, whilst resting in one of its grooves and is then positioned, whilst forming a loop, in a slot of one of the two collars. Under these conditions, each cable element is arranged in an ordered manner within the box and the loop path followed by said element makes it possible to have an extra cable length, which is particularly advantageous for recommencing a splice which is considered to be defective.

BRIEF DESCRIPTION OF THE ACCOMPANYING DRAWING

The invention is described in greater detail hereinafter relative to non-limitative embodiments and with reference to the accompanying drawing, which is a perspective view of the on site connecting device according to the invention.

DETAILED DESCRIPTION OF THE PREFERRED EXEMPLARY EMBODIMENT

According to one embodiment and with reference to the drawing, 1 is a rectangular table for horizontal installation level with four openings 2 on metal parts arranged on either side of a cable tunnel in which the two optical fiber transmission cables 4 and 4' are connected.

Each of the optical fiber cables (4, 4') has, beneath a protective jacket 5, a plurality of cable elements 6, e.g. seven such elements. Each cable element 6 is, for example, constructd in the manner described in European Patent Application No. 36,369 filed and published on Sept. 23, 1981 by the Assignee, for: "Process and apparatus for connecting on site optical fiber cables".

The connecting operation starts by baring a predetermined length of the ends of cables 4 and 4', then maintaining each cable rigidly in place by means of two mechanical members in the form of support beams 8, whereof only one is shown in the drawing and fixed on either side of table 1. Each support beam 8 comprises a suspension arm 9, which can be horizontally and vertically regulated and which is provided at its end with an opening 10 traversed, without clearance, by the jacket 5 of each cable.

On one of its sides, table 1 has a U-shaped notch 12 in which is placed a splicing bench 14 in the form of a rectangular frame, three of whose sides are constituted by shaped sections forming arms (15, 16 and 17) which internally adapt to the U-shape of the table notch 12. The fourth side of bench 14 is constituted by a rail 18 on which can be driven in translation a plurality of tools, whereof only one, i.e. 20 is shown in the drawing, said tools being used for successively carrying out the splicing operations of the different cable elements 6. The various splicing tools 20 can be protected by a visor (not shown) along rail 18, thus obviating the presence of e.g. dust on said rail.

As can be gathered from the drawing, each of the two arms 15 and 17 comprises a member 22 pivotably mounted at one end of a fixed member 23 integral with arm 16. The pivoting of each member 22 makes it possible for the operator to regulate, as required, the height of rail 18 on which the various splices of the cable elements are produced.

The splicing bench 14 is fixed to table 1 by means of a cross-member 25 extending transversely with respect to rail 18 and whereof one end 26 is fixed substantially in the centre of arm 16 and whose other end 28 is mounted in an intermediate member 30 fixed by any appropriate means to table 1 level with its notch 12.

The connecting device also comprises a splicing case or box 35 having a cylindrical shape and whose two end faces have two tight end disks 37, each constituted by two half-shells fixed to one another by means of a metal ring 39 and provided with a central aperture 40 which receives the jacket 5 of each cable (4; 4'). Gaskets (not shown) are positioned on either side of aperture 40 of each end disk 37.

The two end disks 37 of splicing box 35 are interconnected by a metal rod in the form of plate 42, which is substantially of the same length as arm 16 of the splicing bench and which terminates by two clips 43, one of which can be seen in the drawing, fixed rigidly to the lower edges of the two disks 37 respectively.

After fitting the two end disks 37 and rod 42 forming the rigid mechanical connection, box 35 is assembled with bench 14 in the following way.

The rod 42 of box 35 is fitted so as to bear on two supports 45 arranged on bench arm 16 and substantially at an equal distance from cross-member 25. More specifically, each support 45 has an orifice 47 in which is freely engages arm 16 in such a way that each support 45 can slide along said arm. After positioning the two supports 45, the rod 42 of splicing box 35 is fixed to supports 45 by means of any appropriate system constituted for example by screws. Thus, box 35 and bench 14 form a rigid unit.

The connecting device also comprises two cylindrical parts forming storage units or magazines 50, each mounted around the jacket 5 of each cable (4; 4'), i.e. externally of splicing box 35. Each magazine 50 comprises, for example, two identical parts, which can be locked to one another by any appropriate system formed for example by two groups of rods interconnected in pairs at one of their ends by a metal wedge, the two rods of the first pair being able to slide in the two parts respectively. Moreover, each cylindrical magazine 50 has a plurality of recesses 54, whose number is for example equal to that of the cable elements 6 of one same cable (seven in the chosen example), distributed over the circumference of the magazine. Each recess 54 is covered with a tight cap, (not shown) which can be driven in translation so as to ensure the opening and closing of the corresponding recess.

The recesses 54 of each magazine 50 successively receive the parts forming extending end fittings, which act as connectors, mounted at the ends of the different cable elements 6. The connectors are fitted by means of tools 20 mounted on rail 18.

The presence of these magazines 50 is particularly advantageous, because it enables the operator to position each fitted connector in a perfectly sealed protected enclosure and to work on the following cable elements without in any way being disturbed by the already fitted connectors.

Internally, the splicing box 35 has a cylindrical member forming a drum 60 having a plurality of grooves 63 extending over its entire length. The number thereof is equal to the number of cable elements 6 of the two cables, i.e. fourteen in the chosen example and each of these receives a cable element 6. Thus, each cable element 6 on leaving the corresponding end disk 37 of the box, traverses drum 60 whilst resting on one of the grooves 63, passes out of the said drum by a predetermined length and then the end of the cable element is positioned on rail 18, where it is spliced to its homologous cable element.

Drum 60 is covered with a rigid protective sleeve or sheath 68 and two parts forming collars 70 whose respective diameter exceeds that of drum 60, are mounted in annular manner at the ends of sleeves 68. Each collar 70 has a plurality of slots 72 distributed around its circumference and the number thereof is equal to the number of cable elements 6 of one same cable, i.e. seven in the chosen example.

After splicing two cable elements 6, protected by a mechanical part 74, each cable element on leaving drum 60 is introduced into a slot 72 of collar 70 positioned at the end of the drum, where said cable element is passed out. Thus, the path followed by each cable element is constituted by a straight line within drum 60 and a loop forming an extra length terminating after passage in a slot 72 of one of the two collars 70. At 76, it is possible to see the members which close the slot 72 of each collar.

For reasons of clarity, only the path followed by two cable elements 6 once their spliced joint has been completed is shown.

The drum 60 and the two collars 70 can be made from an elastomer material, such as that known for example under the trade name Silastene.

The assembly formed by drum 60 and the two collars 70 is rigidly mounted within box 35 by means of two clips 78 fixed on the one hand to rod 42, for example by means of screws, and on the other to two metal rings 80 mounted around sleeve 68 level with two collars 70. The two rings 80 are interconnected by a plurality of annularly distributed metal bars 82, whose number is equal to that of the cable element 6 of one same cable, i.e. seven in the chosen example.

Each splice protecting part 74, whereof only one is shown in the drawing, is attached to one of the bars 82 for example by means of a plastic ring 84.

Once all the mechanical protection parts 74 are positioned within box 35, a rod 86 identical to that shown in 42 is fitted parallel to the latter on the upper edge of each end disk 37 by means of fixing members for example in the form of clips 88 identical to clips 43. This second rod 86 ensures a greater rigidification of splicing box 35.

The connection of the two transmission cables 4 and 4' is terminated by disengaging box 35 from bench 14, followed by the closing of box 35 by means of a tight cylindrical sleeve (not shown), which bears against the two end disks 37. It is then possible to remove splicing bench 14 and table 1.

What is claimed is:

1. A device for oonneoting on site two optical fiber transmission cables each comprising a plurality of cable elements, said device comprising:

a table to be installed in an on site tunnel and which has a notch on its circumference;

a tight splicing box for protecting the cable elements once they have been connected together and fitted so as to be supported on said table, said box having two lateral faces provided with two openings in which are engaged respectively the two cables to be connected, said splicing boxing comprising (i) a drum member having a cylindrical outer surface and means defining a plurality of grooves in the cylindrical outer surface, each said groove being spaced-apart relative to adjacent grooves and extending over the entire length of said drum member, each of said grooves for housing a predetermined length of each cable element of each cable, and (ii) a pair of collars, the respective diameter of each said collar exceeding a diameter of said drum and mounted in annular manner at two ends of said drum, each of said collars defining slots distributed over the outer circumference thereof, wherein the path followed by each cable element is a straight line within said drum and upon leaving said drum each cable element is inserted in a slot of a respesctive one of said collars positioned as close as possible to the immediate exit of the cable element in such a manner that the straight line of the path is extended by a loop forming an excess length terminating after passage in one of the two collars;

a splicing bench which can be inclined and positioned in said notch, including a rail disengaged from said box and facing the latter and on which are arranged tools used for splicing said cable elements; and means for joining said bench to said table such that bench and table together form a rigid unit.

2. A device as claimed in claim 1, wherein said notch in said table has a U-shape and wherein said splicing bench is substantially in the form of a rectangular frame, whereof three of its sides are constituted by arms internally adapting to the U-shape of said notch and whose fourth side is constituted by a rail on which can be driven in translation said tools for splicing said cable elements.

3. A device as claimed in claim 2, wherein said joining means comprise a cross-member extending transversely with respect to said rail and whereof one end is fixed to the arm of said bench parallel to said rail and whereof the other end is mounted in an intermediate part fixed to said table substantially in the centre of the branch of the U-shaped notch parallel to the rail.

4. A device as claimed in claim 1, wherein said splicing box has a cylindrical shape ansd its two lateral faces have two end disks, interconnected by at least one metal member forming a rod fixed to the periphery of each of the two disks, and wherein said rod is fixed to a member forming a support integral with the arm of the bench parallel to the rail, such that said box and said splicing bench form a rigid unit.

5. A device as claimed in claim 4, wherein said support has an orifice in which is freely engaged the arm of the bench parallel to the rail, said support being able to slide along said arm.

6. A device as claimed in claims 4 or 5, wherein each end disk is constituted by two half-shells, which are fixed to one another and are made from a tight material.

7. A device as claimed in claim 4, wherein said splicing box includes clips for attaching said drum to said rod, said clips being fixed to two metal rings mounted on said drum and interconnected by metal bars, to each of which is to be fixed a mechanical member protecting the finished splice of said cable elements.

8. As device as claimed in claim 1, wherein said drum and said two collars are made from an elastomer material, and wherein said splicing body also has an elastic sleeve covering said drum so as to rigidify the latter.

9. A device as claimed in claim 1, wherein a connector is fitted at the end of each cable element, and wherein said device also includes two parts forming magazines mounted in annular manner on the two portions of the cable located outside of said splicing box respectively and each having tight recesses made on their circumference and which are successively positioned on the fixed connectors.

10. A device as claimed in claim 9, wherein each magazine is in two identical portions, which an be disconnected from one another, and wherein each magazine comprises means for locking said two portions to one another.

11. A device as claimed in claim 1, further comprising two mechanical members in the form of support beams fixed to said table and each having a suspension arm provided with an opening in which is engaged without clearance the portion of the cable located outside said splicing box, thereby rigidly holding in place the two cables to be connected.

12. A device to facilitate the splicing of a pair of fiber optic transmission cables each having plural cable elements, said device comprising in combination:

a table adapted to be installed at the site of a fiber optic cable splice;

a splicing bench fixed to said table for establishing an area uppon which the splicing of paired cable elements of said fiber optic cables is performed; and splicing box means removably fixed to said splicing bench for protecting spliced pairs of said cable elements, said box means including:

(i) housing means having opposing ends and defining therebetween an interior space for accomodating said spliced pairs of cable elements, (ii) a cylindrical drum fixed to said housing means and disposed in said interior space, said drum having a cylindrical outer surface and including means defining plural longitudinal slots in said cylindrical outer surface and radially spaced apart the drum circumference, each said slot defining means for retraining therein a first length of a predetermined one of said cable elements, and (iii) at least one collar member annually mounted at one end of said drum, said at least one collar member includes means defining plural radially spaced apart apertures, each said aperture establishing means for retaining therein a second length of said predetermined one of said cable elements, wherein said predetermined one of cable element is retained by said drum in an orderly fashion in such a manner that a length of said cable element is provided as slack between said first and second lengths respectively retained in said slot and said aperture defining means, said slack length of cable element being housed in said interior space of said housing means to facilitate the resplicing of the paired cable elements.

13. A device as in claim 12, wherein said splicing bench includes a frame, a rail upon which said paired cable elements are adapted to be spliced, and pivot means connecting said frame and rail to permit said rail to pivotally movable between high and low positions.

14. A device as in claim 12 or 13 wherein said bench includes an elongated support rail and a pair of support members slideably mounted to said support rail, said housing means being removably fixed to said support members.

15. A device as in claim 14 wherein said table includes means for suspendably holding said fiber optic cables.

16. A device as in claim 12 or 13 wherein said table includes means for supendably holding said fiber optic cables.

17. A device as in claim 13 wherein said table defines a U-shaped space and wherein said frame includes a pair of separated side arms having said rail pivotally mounted therebetween, said side arms being accommodated by said U-shaped space.

18. A device as in claim 12 13, or 17 wherein said bench further includes fiber optic cable splicing tools mounted to said rail for translational movement therealong.

19. A device as in claim 12 wherein said splicing box means includes a pair of opposing face elements separated from one antoher by a rod, said rod being removably fixed to said splicing bench to form a rigid unit therewith.

20. A device to facilitate the splicing of fiber optic cable elements and for housing spliced cable elements comprising:
   splicing box means defining an interior space for housing and protecting spliced cable elements;
   a drum defining a cylindrical surface and being fixed to said splicing box means in said interior space, said drum means including plural spaced-apart grooves defined in said cylindrical surface and longitudinally extending over the length of said drum for retaining therein a first length of said cable element; and
   at least one collar member defining plural radially spaced-apart apertures for retaining therein a second length of cable, said at least one collar member being annularly mounted to one end of said drum wherein a slack amount cable element is provided between said first and second lengths and housed in said interior space to facilitate the resplicing of the cable element.

21. A device as in claim 12 or 20 further comprising a second collar member annularly mounted to the other end of said drum so as to define with said first-mentioned collar member a space, said second collar member including means defining plural radially spaced-apart second apertures, said second length of cable being retained in said space by means of said first-mentioned and said second apertures.

* * * * *